Figure 1:
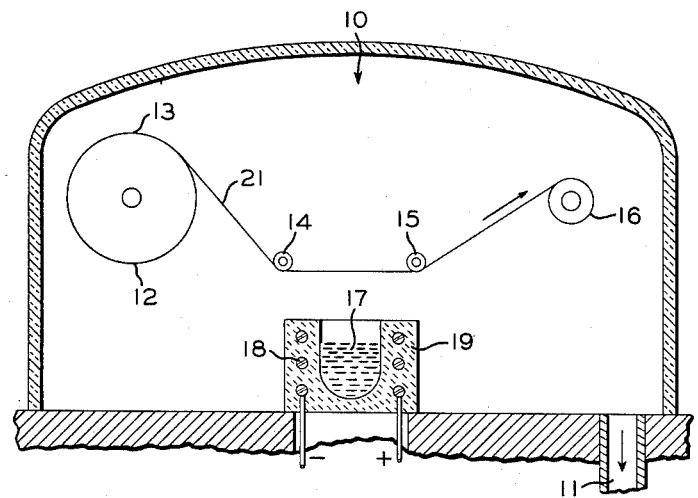

Sept. 6, 1960      D. B. PECK      2,951,774
METHOD OF METALLIZING POLYTETRAFLUOROETHYLENE
Filed Dec. 12, 1955      2 Sheets-Sheet 1

*INVENTOR.*
DAVID B. PECK
BY
HIS ATTORNEY

Sept. 6, 1960    D. B. PECK    2,951,774
METHOD OF METALLIZING POLYTETRAFLUOROETHYLENE
Filed Dec. 12, 1955    2 Sheets-Sheet 2

*INVENTOR.*
DAVID D. PECK
BY
*Roland A. Dexter*
HIS ATTORNEY

United States Patent Office 2,951,774
Patented Sept. 6, 1960

2,951,774

METHOD OF METALLIZING POLYTETRA-
FLUOROETHYLENE

David B. Peck, Williamstown, Mass., assignor to Sprague Electric Company, North Adams, Mass., a corporation of Massachusetts Filed Dec. 12, 1955, Ser. No. 552,642

5 Claims. (Cl. 117—227)

The present invention relates to new and improved dielectric films provided with a metallized surface layer.

This application is a continuation-in-part of United States Patent Application Serial No. 349,837, filed April 20, 1953, now abandoned, which in turn is a continuation-in-part of United States Patent Application, Serial No. 169,797 filed June 23, 1950 and now Patent No. 2,642,625 granted June 23, 1953.

For a great many years, it has been conventional procedure to place metallic conductive surfaces upon dielectric materials by either spraying these materials with a molten metal, or by causing a vapor of metal to condense upon the surface of the material being coated. With the advent of resinous films of polytetrafluoroethylene and polytrifluorochloroethylene, attempts were made to form metallized sheets of these materials utilizing conventional vacuum techniques and processes. These attempts were not successful because metal did not adhere satisfactorily to the resinous films being coated, and because the metallic layers that were produced possessed comparatively high resistance, in the neighborhood of from 15 to 50 ohms per square. The desired resistance of such metallized layers, particularly to be useful as capacitor electrodes, is from about 1 to about 5 ohms per square.

The prior attempts at metallizing fluorine containing polyethylene resin films included efforts at first coating the resin with silver and then subsequently coating it with zinc. This procedure has been particularly satisfactory with many otherwise hard to coat materials, but it failed miserably with resins of the indicated category. Efforts at applying a preliminary silver coating by calendering followed by coating with zinc, were likewise unsuccessful. Other methods, as for example, coating polytetrafluoroethylene resin tape with cellulose acetate and cellulose nitrate were also unsuitable. Numerous types of films of polytetrafluoroethylene resin are commercially available and usually designated as to manner in which they are produced, and include shaved, extruded and cast films.

It is an object of the instant application to teach a method of producing metallized polytetrafluoroethylene film. It is a further object of the instant application to teach a method of producing metallized cast polytetrafluoroethylene film. It is a still further object of this invention to utilize metallized cast polytetrafluoroethylene resin films for fabrication of metallized capacitors of unusual electrical characteristics.

Figures 2, 3:
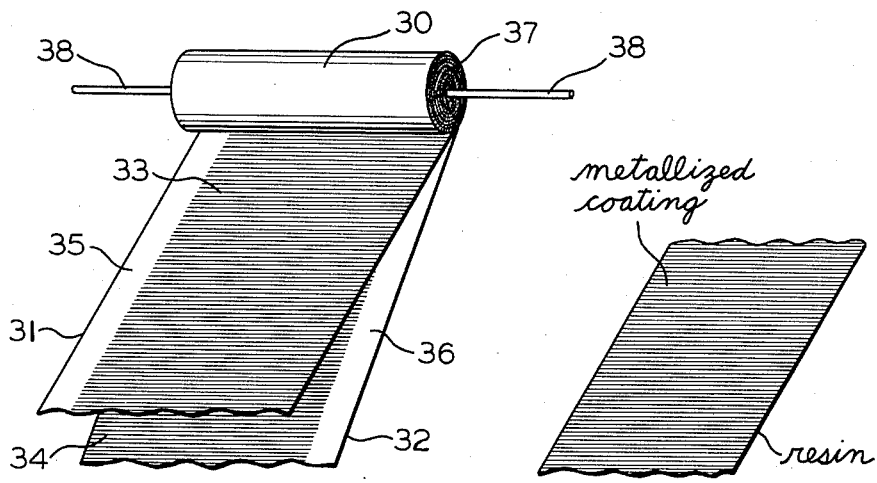

Other objects of the invention, as well as the advantages of it, will be apparent from this application, the appended claims, and the accompanying drawings in which: Figure 1 diagrammatically shows an apparatus for coating resin films; Figure 2 shows a metallized polytetrafluoroethylene resin cast film useful as a composite capacitor dielectric and electrode; and, Figures 3 and 4 picture partly unrolled capacitors fabricated out of metallized polytetrafluoroethylene resin film in accordance with this invention.

Briefly, metallized dielectrics of the type indicated are produced according to the teachings of this application by passing a surface degassed cast film of polytetrafluoroethylene resin adjacent to a heated vessel of the metal being applied to the film, said vessel subjected to a reduced pressure within the range of less than 50 microns, said film positioned at least 3 inches from said vessel. Suitable metals useful with the invention are aluminum, cadmium, magnesium, silver, copper, nickel and zinc. The metallized dielectric is fabricated into capacitors which have been found to be devices of unusually superior electrical characteristics. Alternatively when it is desired to metallize the extruded or shaved forms of polytetrafluoroethylene films, one should use pressures of from about 0.05 micron to about 1 micron to obtain the improved adherent film of desired resistivity suitable for convolutely wound capacitor construction. Particularly useful for these latter types is aluminum metal which gives a superior coating when used as capacitor electrodes for high temperature applications.

Perhaps the initial disclosure of this invention will be best understood with reference to Figure 1 of the accompanying drawing in which there is shown a vacuum chamber 10 connected by means of a pipe 11 to a pump capable of creating the desired pressure as indicated above. Within this chamber, there is placed a feed roller 12 containing a roll 13 of cast polytetrafluoroethylene resin tape 21. This tape 21 is passed between supports 14 and 15, and thence onto take-up roller 16. During the period of the travelling of the tape between the supports 14 and 15, it is immediately adjacent to a ceramic vessel 19 containing a mass of metal 17 of the type indicated above, which is held above its melting point by means of a resistance coil 18 embedded within the walls of the vessel 19. The initial evacuation chamber maintained at a low pressure of 5 to 50 microns of mercury for surface degassing is not pictured, but it is to be understood that said evacuation chamber has the resin film slowly passed through it prior to entrance into the metallizing phase.

The precise speed with which the resin tape 21 is passed immediately above the vessel 19 shown in the drawing depends to a large part upon the pressure within the vacuum chamber 10, the nature of the film, and its past history (including orientation), as well as the temperature of the metal 17. In general, the higher the vacuum, the more rapidly the film may be transported past the source of metal vapor. For optimum results, this film should be positioned so as to pass no closer to the source of metal vapor than three inches and preferably at a distance of 5 to 10 inches; in no case should this distance exceed 15 inches.

It has been quite surprising to find that the optimum position for the film as it passes over the source of metal vapor is not in conformance with the established techniques of metallizing dielectric films. Whereas in the past it has proven desirable to maintain the passage of the films in close proximity to the source of metal vapor, with films such as the polytetrahaloethylene resins, it became necessary to remove the film path to a position of relatively great distance from the source of the metal vapor in order to obtain a satisfactory product. It should be further noted that for optimum film formation, the surface of the resin must be effectively degassed from its initial state of containing adherent and occluded surface gasses which exists in its commercially produced form. The final important processing condition which is intimately connected with the formation of films of desired physical and electrical properties is the conduction of the metallizing step in an atmosphere of extremely low pressure. Whereas it has been possible with other dielectrics to readily metallize them in atmospheres of 200 microns of mercury pressure, the present process for the preparation of the metallized surfaces of polytetrahaloethylene resins requires an atmosphere of no greater than 50 microns of mercury pressure and preferably 25 microns of pressure or lower for the cast films and less than one micron for the other types. Unless these metallized films are sufficiently adherent and are of resistivity within the range previously prescribed, it has been found difficult to produce convolutely wound metallized capacitors of acceptable electrical characteristics. Extruded and shaved polytetrafluoroethylene resin films are satisfactorily coated only when the film is coated in a pressure atmosphere of from about 0.05 to about 1 micron. With higher pressures, that is within the 1 to 50 micron range which is a portion of the range taught by the McManus et al. Patent No. 2,382,432, metallized shaved films are suitable for limited capacitor use such as in stacked construction which does not lend itself as readily to manufacturing ease and/or the capacity per unit volume available with convolutely wound construction.

As disclosed above, polytetrafluoroethylene films have been produced in numerous fashions, each process resulting in a product having its own particular surface metallizing characteristics. These films include the shaved, the preparation of which is hereafter set forth; the extruded, which can be either cured or uncured, (curing results from sintering at a temperature of from 350 to 380° C.) is produced according to the United States Patent No. 2,593,582; the cast according to Puppolo, United States Patent No. 2,540,962; and the thin shaved film which is hot calendered under tension according to my United States Patent No. 2,642,625. Even more favorable adhesion with the latter types obtains when the film is initially coated with silver under similar pressure conditions. Particularly startling was the excellent adhesion of the metal for the cast polytetrafluoroethylene films at pressures of from 25 to 50 microns.

As an example of the process of the invention, a 0.5 mil cast polytetrafluoroethylene resin type was passed eight inches from the surface of a mass of molten zinc held at 1000° C. at a speed of about 2 inches per minute within a vacuum chamber held at about 25 microns pressure. Such a film is pictured in Figure 2. For the extruded film, aluminum deposited as an adherent film by exposure to the metal vapor from molten aluminum at 1080° C. for 1 minute at .08 micron pressure produced an adherent coating.

A further type of resinous dielectric film which has not been satisfactorily metallized by recognized vapor metallization techniques is polytetrahaloethylene resins, particularly polytetrafluoroethylene resin, containing dispersed inorganic materials in minor amounts. A ceramic-containing polytetrafluoroethylene resin film was produced by dispersing milled ceramic material in a polytetrafluoroethylene resin aqueous suspension. The ceramic content of the slurry was adjusted so that the resulting mixture contained approximately 30% of ceramic based on the total weight of polytetrafluoroethylene resin and ceramic in suspension. By dip coating a copper foil with the suspension at a foil speed of 9 feet per minute, followed by sintering in an oven at approximately 350° C. for 1 minute, and thereafter recycling the process two times, a 1 mil cast polytetrafluoroethylene resin film containing 30% of ceramic particles was produced. This film was found to have a dielectric constant of 4.4 at 25° C. with a temperature coefficient for the dielectric constant of −380 p.p.m./° C. The dielectric strength of the material was in excess of 1500 volts per mil and the percentage dissipation factor at 850 kilocycles over the range of −60 to +260° C. was below 0.5%. This ceramic-containing polytetrafluoroethylene resinous film was not susceptible to metallizing in the usual fashion found satisfactory for other dielectric materials. By conducting the metallizing process in the manner set forth above for the cast films, satisfactory metallized films were produced, said metallized films possessing resistances of from about 1 to 5 ohms per square with excellent adherence to the resin surface.

An additional type of resinous dielectric material was prepared in a thickness of 2 mils by shaving film from a solid molded rod of polytetrafluoroethylene resin. This film which was shaved from the rod was slightly opaque and cloudy in appearance and was processed in accordance with my invention disclosed in the parent case, Serial No. 169,797, filed June 23, 1950 (now U.S. 2,642,625), by passing it over a stretching roll with a tension of about 2½ pounds per inch width of polytetrafluoroethylene resin to increase the length of the film by a factor of about 2.3. The stretching roll was maintained at 150° C. The film at this point was very cloudy and structurally weak. The film was then passed through the calendering rolls maintained at 150° C. by steam and under a compressive force of 25 tons on 8 inch diameter rolls (sample was 2 inches wide). The calendering speed, that is the speed of the film from the calender roll, was about 60 feet per minute. The resulting film was transparent and very tough, possessing a thickness of about .6 mils. The dielectric strength of this thin film, as determined by a mecury immersion test varied from about 2000 to 2600 volts per mil, the average being about 2300. This technique of preparing polytertahaloethylene resin films of substantially less than 1 mil reduces the opacity of the original film to such a degree that it becomes highly transparent and resembles clear cellophane. An additional film of .9 mil thickness was prepared in the manner set forth above by hot calendering 2.4 mil thick polytetrafluoroethylene resin film with simultaneous application of tension. A comparison is made of the transparency of the films prepared in this manner with the transparency of a cast polytetrafluoroethylene resin film, which to my knowledge is the only manner presently known outside of my process for preparing polytetrahaloethylene resin films of substantially less than 1 mil thickness. The results of the test are hereafter set forth in tabulated form:

| Thickness of Film (mils) | Method of Preparation of Film | Percent Transmission [1] of Incandescent Light |
| --- | --- | --- |
| 0.5 | Cast | 83.3 |
| 1.0 | do | 71.6 |
| 0.6 | Hot calendered under tension | 86.5 |
| 0.9 | do | 85.0 |

[1] Measured on Fisher electrophotometer.

These highly transparent films prepared in accordance with the teachings of my invention fulfill the numerous requirements in the electrical and chemical industries. The transparency of the film combined with the chemical and thermal inertness of the resin and the excellent electrical characteristics make possible its utilization in many embodiments, a few of which are: a base material for photographic emulsions wherein the film is used under conditions of abnormally high temperature; as a replacement for thin films of quartz in apparatus subjected to severe mechanical vibration; applications that require resistance against thermal and/or chemical action, etc.

Figure 4:
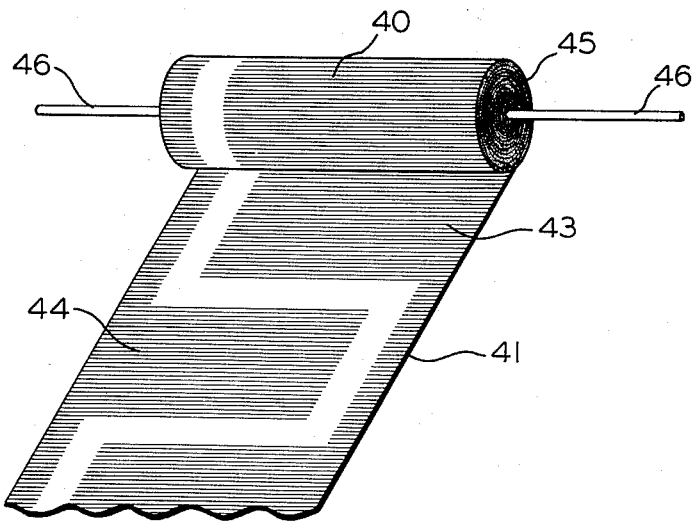

Referring again to the drawing, there is shown in Figures 3 and 4 two types of metallized capacitors produced with the metallized dielectric of the invention. In Figure 3 the section 30 is of a conventional two dielectric layer metallized capacitor. As is readily seen it consists of two separate dielectric films 31 and 32 which are metallized with their respective coatings 33 and 34. Each is margined at 35 and 36 respectively. After winding, each end of the convolutely wound section is sprayed with a metallic coating 37 to which terminal lead wires 38 are electrically joined to the respective electrode, that is, the metallized coating which extends to that particular end of the capacitor. Fig. 4 shows what is commonly known as a single film capacitor in which it is readily seen that the convolutely wound section 40 has but a single layer of dielectric material 41. This dielectric material of polytetrafluoroethylene resin is metallized on both surfaces, which metallized coating has a zigzag pattern traced in it separating the two electrode members 43 and 44. This technique of producing single film capacitors is well-known to the art and needs no further elaboration. Again the ends of the convolutely wound section are electrically joined to their respective terminal lead wires 46 by means of sprayed deposited coating 45.

As an example the device produced in accordance with this invention, two .5 mil thick polytetrafluoroethylene resin metallized with aluminum having a resistivity of 3 ohms per square were convolutely wound into the capacitor structure of Figure 3. This capacitor had markedly improved electrical characteristics of unpredictable magnitude. First of all it exhibited exceptional constancy of capacitance from room temperature to 150° C. Secondly its insulation resistance at this elevated temperature of 150° C. was unexpectedly high; for a .1 mfd. section it showed a megohm-micro-farad value of approximately 750. Finally it is known that foil-type polytetrafluoroethylene resin capacitors have unfortunately low corona starting voltages. In contrast the metallized polytetrafluoroethylene units have considerably improved corona starting voltages. When it is desired to further enhance the capacitance per unit volume value over that known by the art, the above metallized polytetrafluoroethylene structure can be replaced by the zinc metallized cast polytetrafluoroethylene resin film containing 30% of ceramic particles as previously discussed. The electrical characteristics of such a structure have already been set forth.

It is thus seen that metallized polytetrahaloethylene resins and particularly the metallized cast polytetrafluoroethylene resin film can be used to produce novel electrical capacitors of improved electrical characteristics hitherto thought unattainable. In particular the desired increased capacitance per unit volume is achieved without suffering gross reductions in leakage resistance and in fact with an improved leakage resistance at elevated temperatures. It should be further stressed that the susceptibility of polytetrahaloethylene resinous films and in particular the polytetrafluoroethylene resinous films, to low corona voltages has been overcome in the device of the invention. Further for extended electrical life aluminum and nickel metallized coatings are preferred.

Obviously, other devices besides the one specifically indicated herein in a diagrammatic manner may be used to create coated foils as described in this invention. Modifications of the above capacitor constructions are also believed to be well within the skill of the art, and include a foil-metallized polytetrafluoroethylene film electrode construction, as well as metallized films combined with porous spacers for ease of impregnation.

As many apparently widely different embodiments of my invention may be made without departing from the spirit and scope hereof, it is to be understood that my invention is not limited to the specific embodiments hereof, except as defined in the appended claims.

I claim:

1. A process of producing a firmly adherent low resistance metallized coating upon a polytetrafluoroethylene resinous film which comprises placing said film within an evacuated chamber at a pressure of less than 50 microns and directing metallic vapor onto the surface of said film from a body of molten metal located between 3″ and 15″ from said film.

2. The process of claim 1 in which said film is shaved and the pressure is less than 1 micron.

3. The process of claim 1 in which the film is a cast film and the pressure is less than 25 microns.

4. The process of claim 1 in which the film is an extruded film and the pressure is less than 1 micron.

5. The process of claim 1 in which the film is one that has been calendered at its transition temperature and under tension, and the chamber pressure is less than 1 micron.

References Cited in the file of this patent

UNITED STATES PATENTS

| | | |
|---|---|---|
| 2,382,432 | McMannus et al. | Aug. 14, 1945 |
| 2,495,630 | Dorst | Jan. 24, 1950 |
| 2,642,625 | Peck | June 23, 1953 |
| 2,689,805 | Croze et al. | Sept. 21, 1954 |

FOREIGN PATENTS

| | | |
|---|---|---|
| 686,031 | Great Britain | Jan. 14, 1953 |

OTHER REFERENCES

"Metal Coatings by High Vacuum Evaporation," by P. Godley in The Iron Age, April 1, 1948, pages 90–94, vol. 161.